United States Patent [19]

Konno et al.

[11] Patent Number: 4,673,791
[45] Date of Patent: Jun. 16, 1987

[54] METHOD AND APPARATUS FOR CONTROLLING AN ELECTRIC DISCHARGE MACHINE

[75] Inventors: Masanori Konno, Isehara; Kiyoshi Imai, Hiratsuka; Toshihiro Dobashi, Koufu, all of Japan

[73] Assignee: Amada Company, Limited, Japan

[21] Appl. No.: 768,436

[22] Filed: Aug. 22, 1985

[30] Foreign Application Priority Data

Aug. 27, 1984 [JP] Japan ................................ 59-176635

[51] Int. Cl.$^4$ .............................................. B23H 1/02
[52] U.S. Cl. ................................ 219/69 M; 219/69 C
[58] Field of Search ................. 219/69 C, 69 S, 69 G, 219/69 P

[56] References Cited

U.S. PATENT DOCUMENTS

| | | | |
|---|---|---|---|
| 3,277,337 | 10/1966 | Webb | 219/69 P |
| 3,474,216 | 10/1969 | Morgan, Jr. | 219/69 G |
| 3,531,615 | 9/1970 | Zammit | 219/69 G |
| 3,588,428 | 6/1971 | Sennowitz | 219/69 P |
| 3,627,968 | 12/1971 | Sennowitz | 219/69 C |
| 3,649,802 | 3/1972 | Sennowitz | 219/69 C |
| 3,670,136 | 6/1972 | Saito et al. | 219/69 C |
| 3,697,719 | 10/1972 | Verner et al. | 219/69 S |
| 3,705,286 | 12/1972 | Kondo et al. | 219/69 S |
| 3,812,317 | 5/1974 | De Bont et al. | 219/69 C |
| 3,843,864 | 10/1974 | Wohlabaugh | 219/69 G |
| 3,864,541 | 2/1975 | Inoue | 219/69 G |
| 3,875,362 | 4/1975 | Balleys | 219/69 P |
| 3,912,898 | 10/1975 | Pfau et al. | 219/69 P |
| 3,916,138 | 10/1975 | Pfau | 219/69 P |
| 3,943,321 | 3/1976 | Pfau et al. | 219/69 P |
| 3,997,753 | 12/1976 | Inoue | 219/69 C |
| 4,004,123 | 1/1977 | Inoue | 219/69 P |
| 4,009,361 | 2/1977 | Stanton et al. | 219/69 C |
| 4,021,635 | 5/1977 | Losey et al. | 219/69 P |
| 4,071,729 | 1/1978 | Bell, Jr. | 219/69 G |
| 4,236,057 | 11/1980 | Inoue | 219/69 P |
| 4,292,490 | 9/1981 | Bell, Jr. et al. | 219/69 C |
| 4,376,880 | 3/1983 | Inoue | 219/69 P |

FOREIGN PATENT DOCUMENTS

| | | | |
|---|---|---|---|
| 83858 | 7/1983 | European Pat. Off. | 219/69 C |
| 114622 | 9/1981 | Japan | 219/69 C |
| 206313 | 12/1983 | Japan | 219/69 C |
| 84/01915 | 5/1984 | PCT Int'l Appl. | 219/69 S |
| 1289612 | 9/1972 | United Kingdom . | |
| 1384863 | 2/1975 | United Kingdom . | |
| 1388301 | 3/1975 | United Kingdom . | |
| 2016346 | 9/1979 | United Kingdom . | |

Primary Examiner—A. D. Pellinen
Assistant Examiner—Geoffrey S. Evans
Attorney, Agent, or Firm—Wigman & Cohen

[57] ABSTRACT

A process and apparatus for controlling an electric discharge machine consisting of applying a pulse voltage across a working gap when the predetermined time of interruption of the electric discharge has lapsed and when the interpolar voltage has exceeded a reference voltage, increasing the reference voltage and lengthening the time of interruption of the electric discharge when the rate of abnormal discharge occurrence becomes greater than an allowable rate and decreasing the reference voltage and reducing the time of interruption of the electric discharge when the rate of abnormal electric discharge occurrence is less than an allowable rate.

7 Claims, 10 Drawing Figures

FIG. 9

| No | | Ip | Ton | Toff | ------ | μmRmax | γ % | g/min | μm | |
|---|---|---|---|---|---|---|---|---|---|---|
| 123 | + | 5 | 10 | 10 | ------ | 14 | 1 | 0.2 | 30 | |

R 5 IN , W 1 IN, --------

| R | W |
|---|---|
| V | E |
| S | IN |

| 7 | 8 | 9 |
|---|---|---|
| 4 | 5 | 6 |
| 1 | 2 | 3 |
| 0 | . | ± |

Rmax

| | 1 | 2 | 3 | 4 | 5 | ... | 13 | 14 | 15 |
|---|---|---|---|---|---|---|---|---|---|
| μm Rmax | R≤1 | 1<R≤2 | 2<R≤4 | 4<R≤8 | 8<R≤15 | ... | 60<R≤80 | 80<R≤100 | 100<R |

(B)

γ %

| | 1 | 2 | 3 | ... | ... | ... | 8 | 9 | 10 |
|---|---|---|---|---|---|---|---|---|---|
| γ % | γ≤1 | 1<γ≤2 | 2<γ≤5 | ... | ... | ... | 40<γ≤60 | 60<γ≤90 | 90<γ |

METHOD AND APPARATUS FOR CONTROLLING AN ELECTRIC DISCHARGE MACHINE

BACKGROUND OF THE INVENTION

1. Field of the Invention

The present invention relates to an electric discharge machine, and more particularly to a method and apparatus for controlling an electric discharge machine in which the ratio of occurrence of abnormal electric discharge occurring from the interpolar insulation malfunction is detected. The optimum value for the interpolar status during the interruption of the electric discharge is automatically adjusted corresponding to the interpolar condition, while a plurality of combinations of the electrical processing conditions by the input of process characteristics, such as process velocity and degree of roughness of the finishing surface, such as the maximum value of the electric discharge current and the time of interruption of the electric discharge, corresponding to those process characteristics are displayed, in order, on a display apparatus.

2. Description of the Related Art

It is well known that in order to be able to increase the efficiency of the electric discharge process the time of interruption of electric discharge may be reduced. However, if this interruption time is reduced excessively, a fine powder of processed metal and so on removed in the melted form is not adequately discharged from the working gap. Then the insulating conditions of the working gap do not adequately recover before a pulse voltage is applied. Abnormal discharge, such as arcing, is produced, so that the accuracy and efficiency of the machining of the workpiece is reduced. Accordingly, the time of interruption of electric discharge must be suitably controlled to match the interpolar insulation conditions.

However, the speed of restoration of these insulation conditions is not uniform, but is, for example, effected by the flow conditions of the dielectric fluid and the electric discharge time, etc. Accordingly, it is difficult for the operator to set the time of interruption of the electric discharge to match the conditions existing each time this occurs.

In addition, it is necessary to set the processing conditions, such as appropriate electrodes, polarity, maximum value of electric discharge current, time of interruption of electric discharge, etc., according to the processing characteristics, such as the material of the workpiece, the roughness of the finished surface, process speed, etc. Because there are a great number of combinations of these processing conditions, it becomes an extremely complex and difficult problem for the operator to set these conditions individually.

Accordingly, with conventional equipment, the method is used by which many matched process characteristics and process characteristics and process conditions are stored in the memory of the control equipment, and the operator selects the appropriate conditions to conform to the desired process characteristics from among the matching conditions displayed on the display equipment, and sets these conditions, in the control device. In such a method, a plurality of process conditions are generally required to satisfy a single process characteristic. For example, in the case where among the process characteristics, only the finished surface roughness is important, and other characteristics are not looked upon as being particularly important, the number or freedom of process conditions which can be selected becomes fairly large. In other words, the smaller the number of required process characteristics is, the more the freedom of the process conditions. Accordingly, it is not desirable to set process characteristics and process conditions one against one when the freedom of process characteristics is large because the operator's selection is unduly limited.

SUMMARY OF THE INVENTION

A first object of the present invention is to provide a method and apparatus for optimum control of the time of interruption of the electric discharge, based on a comparison of a previously set allowable ratio and the detected ratio of abnormal discharge occurrence.

In order to achieve this object, in the present invention, when the time of interruption of the electric discharge is excessive and when the interpolar voltage exceeds a standard voltage, a pulse voltage is applied over the working gap, and when the rate of abnormal discharge occurrence becomes greater than an allowable rate, the standard voltage is increased, and the time of interruption of the electric discharge is lengthened. When the rate of abnormal electric discharge occurrence is less than the allowable rate, the standard voltage is lowered and the time of interruption of the electric discharge is reduced. All the necessary circuits for implementing this method are provided.

A second object of the present invention is to provide a method by which the processing conditions are automatically set by inputting the process characteristics into the control device, and by which it is possible for the operator to make selections and settings when there is a plurality of a group of corresponding process conditions.

In order to achieve this object in the present invention, a plurality of groups of a matched plurality of processing characteristics corresponding to a plurality of processing conditions, and a plurality of process characteristics which are classified into ranges of process characteristics, are stored in the memory of a control device. The combined processing conditions and characteristics are retrieved by specifying process characteristics based on the above-mentioned classification. In addition, combinations which satisfy the input process characteristics are displayed in order, and the displayed combinations are set as operating conditions.

Other and further objects and advantages of the present invention will be apparent from the following description and accompanying drawings which, by way of illustration, show a preferred embodiment of the present invention and the principle thereof.

BRIEF DESCRIPTION OF THE DRAWINGS

FIG. 9 is an explanatory drawing of the input section shown in FIG. 7.

FIG. 10 is an explanatory drawing showing an example of the input data.

DESCRIPTION OF THE PREFERRED EMBODIMENTS

Figure 1:
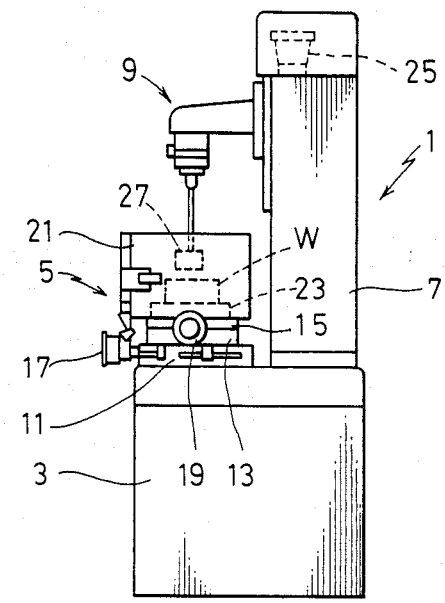
FIG. 1 is a side elevational view showing, an electric discharge machine which is an embodiment of the present invention.

Now referring to FIG. 1, an electric discharge machine 1 comprises a box-shaped base 3, an XY cross table device 5 installed on the base 3, and a processing head 9 installed so that it is able to travel vertically on a hollow column 7 vertically erected on the upper surface of the back section of the base 3. The XY cross table device 5 comprises a Y-axis table 13 which freely moves along the Y-axis direction guided on a guide table 11 installed on the upper surface of the base 3, and an X-axis table 15 installed so that it freely moves along the X-axis on the Y-axis table 13. The Y-axis table 13 is constructed so that it moves along the Y-axis by means of a Y-axis servomotor 17 installed on the guide table 11. The X-axis table 15 is constructed so that it moves along the X-axis by means of an X-axis servomotor 19 installed on the Y-axis table 13. Mounted on the X-axis table 13 is a process tank 21 within which a work table 23 for supporting a workpiece W is installed.

The process head 9 is constructed so that it moves vertically by means of a servomotor 25 mounted on the upper section of the column 7. A tool electrode 27 for carrying out the electric discharge machining process on the workpiece W is mounted in a freely movable and removably exchangeable manner on the process head 9.

By means of the construction described above, the tool electrode 27 and the workpiece W can be brought into proximity, and by applying a pulse voltage to the working gap between the electrode 27 and the workpiece W, an electric discharge is produced so that electric discharge machining can be carried out on the workpiece W.

Figure 2:
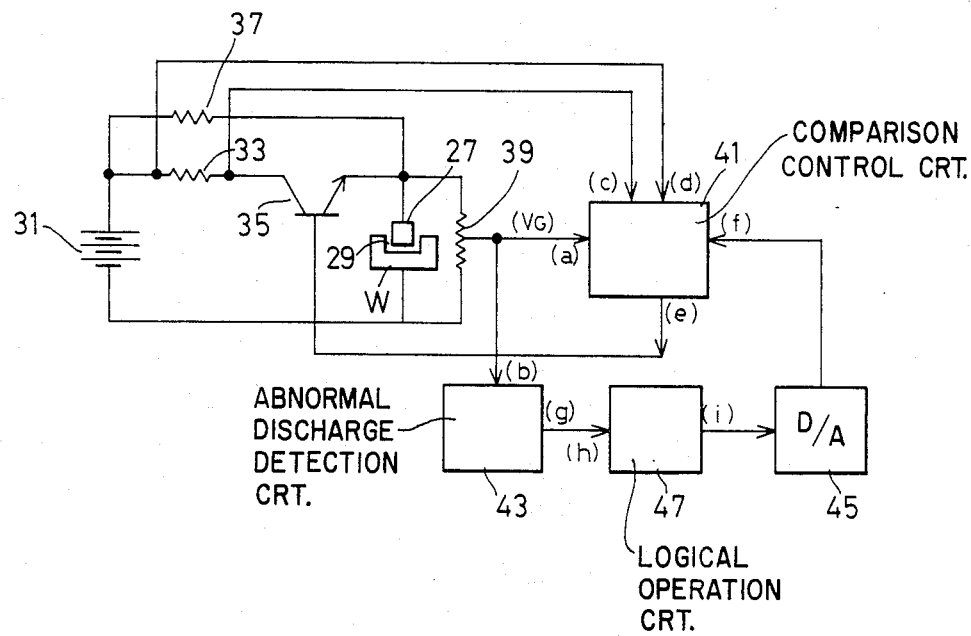
FIG. 2 is a block diagram showing a first embodiment of the present invention.

Now referring to FIG. 2, a minute working gap 29 is maintained between the process electrode 27 and the workpiece W. A processing power source 31, a resistance 33, and a switching element, such as a transistor 35, are connected in series to the electrode 27 and the workpiece W.

In the connection circuit for the resistance 33 and the transistor 35, a resistance 37, for the normal flow of a minute electric current of a degree that does not produce an electric discharge in the working gap 29, is connected in parallel. Furthermore, a detection resistance 39, for detecting the voltage across the working gap 29, is connected in parallel with the working gap 29. The voltage output of the detection resistance 39 is split at a suitable position to apply the divided voltage to both the input section (a) of a comparison control circuit 41 for controlling the ON-OFF status of the transistor 35 and the input section (b) of an abnormal discharge detection circuit 43.

The comparison control circuit 41, as will be later described, compares an interpolar voltage $V_G$, suitably split off from the resistance 39, and a first standard voltage V1. The ON-OFF configuration of the transistor 35 is controlled based on the result of that calculation.

The voltages at both ends of the resistance 33 are input to the comparison control circuit 41, and an output section (e) of this circuit is connected to the transistor 35. An output section of a D/A converter 45 is connected to an input section (f) of the comparison control circuit 41.

The abnormal discharge detector circuit 43, as will be later described, is constructed to output a pulse signal for each abnormal electric discharge detected, and has an output section (g) connected to an input section (h) of a logical operation circuit 47.

The logical operation circuit 47, as will be later described, counts the pulse signals received from the abnormal discharge detection circuit 43 and compares the total count within a prescribed time to a set allowable value. Based on the results of this calculation, the logical operation circuit 43 outputs an instruction signal to the D/A converter 45.

The D/A converter 45 outputs an analogue signal, based on the instruction signal from the logical operation circuit 43, to the input section (f) of the comparison control circuit 41.

Figure 3:
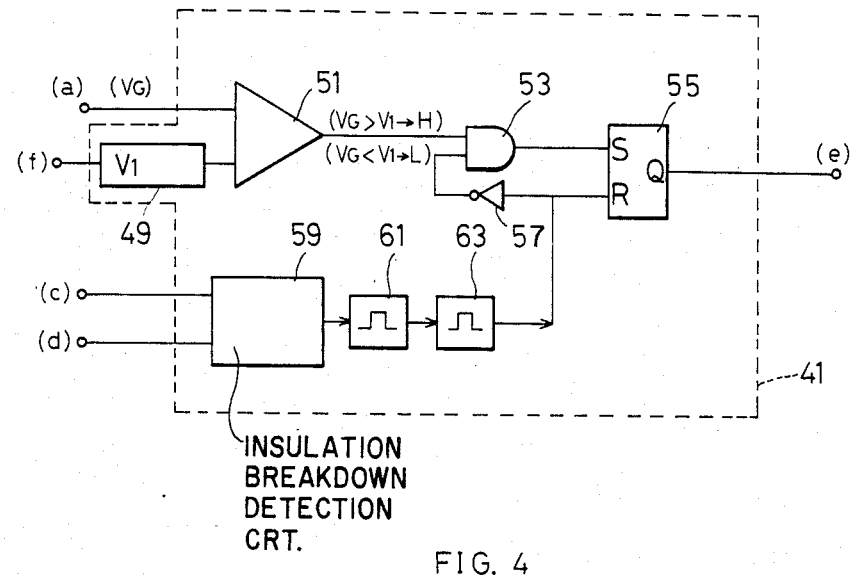
FIG. 3 is a block diagram showing the configuration of the control circuit shown in FIG. 2.

The comparative control circuit 41, as shown in FIG. 3, comprises such components as a first reference voltage setting circuit 49, a comparator circuit 51, a first AND gate 53, a first RS flip-flop 55, an inverter 57, an insulation breakdown detection circuit 59, a first monostable multivibrator 61, and a second monostable multivibrator 63.

Specifically, the first standard voltage setting circuit 49 is used for setting the first reference voltage slightly higher than the electric discharge voltage in the working gap 29. The first reference voltage V1 is set by means of an analogue signal output from the D/A converter 45. The first reference voltage V1, set by means of the first reference voltage setting circuit 49, is input to one section of the comparator circuit 51.

The comparator circuit 51 compares the first reference voltage V1 with the interpolar voltage $V_G$ which is input to the input section (a). When $V_G$ is greater than V1, a high level signal (H) is output to one section of the first AND gate 53. When $V_G$ is less than V1, a low level signal (L) is output to one section of the first AND gate 53.

The insulation breakdown detection circuit 59 detects any breakdown in the interpolar insulation. By means of the ON action of the transistor 35, it detects the rise of the flow of the interpolar current at the resistance 33 as a change in voltage. When the rise of the interpolar current is detected by the circuit 59, it acts as a trigger signal and is input to the first monostable multivibrator 61.

The first monostable multivibrator 61 is activated almost simultaneously with the electric discharge in the working gap 29, and its output is input to the second monostable multivibrator 63.

The second monostable multivibrator 63 uses the pulse signal of the first monostable multivibrator 61 at the fall from the high level to the low level as a trigger, so that it can output a high level pulse. The output section of the second monostable multivibrator 63 is connected to the reset of the first RS flip-flop 55, and is, also connected to the other input section of the AND gate 53 through the inverter 57.

The AND gate 53 takes the logical product of the input signal from the comparator circuit 51 and the output signal from the second monostable multivibrator 63 inverted through the inverter 57, and when both input signals are high level, it outputs a high level signal. The output section of the AND gate 53 is connected to the set terminal S of the first RS flip-flop 55.

The first RS flip-flop 55 is set by the high level signal output from the AND gate 53 and reset by the high level signal output from the second monostable multivibrator 63. The output terminal Q of the first RS flip-flop 55 is connected to the base of the transistor 35 through the output section (e). The first RS flip-flop 55 when set, outputs a high level signal from the output terminal Q; and when reset, outputs a low level signal. Accordingly, the ON-OFF status of the transistor 35 is controlled by the first RS flip-flop 55.

Figure 4:
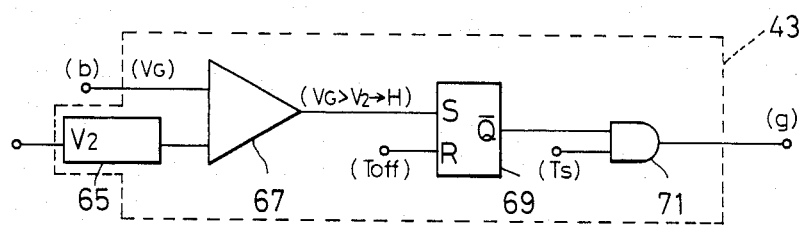
FIG. 4 is a block diagram showing the configuration of the abnormal discharge circuit shown in FIG. 2.

Now referring to FIG. 4, the abnormal discharge detection circuit 43 comprises a second basic voltage setting circuit 65, a second comparator circuit 67, a second RS flip-flop 69, and a second AND gate 71.

Specifically, the second reference voltage setting circuit 65 sets the second basic voltage V2 to a value which is higher than the first reference voltage V1 and slightly lower than the ignition voltage of the working gap 29. Its output section is connected to one of the input sections of the second comparator circuit 67. The first reference voltage V1 and the second reference voltage V2 set the reference value of the impedance of the working gap 29 by the respective interpolar voltages. The first reference voltage V1 is a variable, while the second reference voltage V2 is a fixed value.

The second comparator circuit 67 compares the second reference voltage V2, which is set by the second reference voltage setting circuit 65, with the interpolar voltage $V_G$ which is applied to the other input section (b). The second comparator circuit 67 outputs a high level signal H to the set terminal S of the second RS flip-flop 69 when $V_G$ is greater than V2, and a low level signal when $V_G$ is less than V2.

The second RS flip-flop 69 is set by the input of the high level signal output from the second comparator circuit 67 to the set terminal S. It is reset by the input of the process pulse, and a signal synchronized with the off time width (Toff) of the process pulse to the reset terminal R for resetting. When this second RS flip-flop 69 is set by the high level signal from the second comparator 67, the low level signal converted from the output terminal $\bar{Q}$ is output to one of the input sections of the second AND gate 71.

The second AND gate 71 obtains the logical product of the input signal provided from the output terminal $\bar{Q}$ of the second RS flip-flop 69, and the sampling pulse Ts, generated either directly after insulation breakdown of the working gap 29 or during ontime continuation of the process pulse after the insulation breakdown. Accordingly, the second AND gate 71 only outputs a high level signal when the signal input to it from the second RS flip-flop 69 reaches the high level resulting from the input of the sampling pulse Ts. The output section (g) of the second AND gate 71 is connected to the logical operation circuit 47. When the high level signal is output from the second AND gate 71, the electric discharge has commenced before the interpolar voltage $V_G$ reaches the value of the second reference voltage V2. This means that abnormal discharge has occurred.

Figure 5:
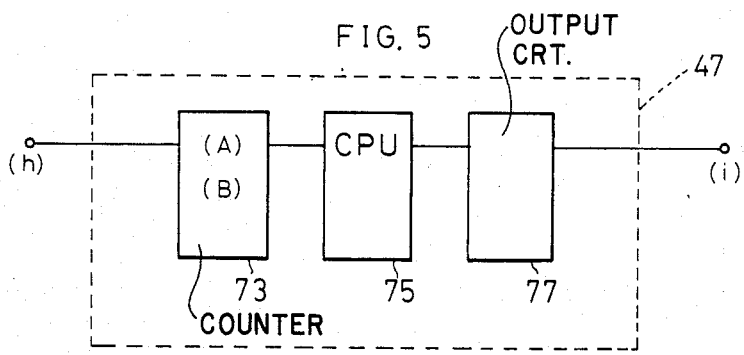
FIG. 5 is a block diagram showing the configuration of the circuit shown in FIG. 2.

The logical operation circuit 47, as shown in FIG. 5, comprises a programmable counter 73, a CPU 75, and an output circuit 77.

Specifically, the programmable counter 73 comprises a counter (A) and a counter (B). Its output section is connected to the input section of the CPU 75. The counter (A) counts the pulse signal input from the AND gate 71 of the abnormal discharge detection circuit 43 through the input section (h). Counter (B) counts the clock pulses, and when a prescribed time has passed, outputs an interrupt request signal to the CPU 75.

On receiving the interrupt request from the counter (B) of the programmable counter 73, the CPU 75 accepts the total count (D) from the counter (A), calls up a pair of abnormal discharge generation normal values N1 and N2 (where N1 is greater than N2), which have been previously set as allowable values, and carries out a comparison operation. The CPU 75 is connected to the input section of the output circuit 77 so as to output an instruction signal to the output circuit 77, such that when the result of the comparison of the total count (D) with the reference values N1 and N2 shows that D is greater than N1, the first reference voltage V1 is raised one stage, and when D is less than N2, the first reference voltage V1 is lowered one stage. When the relationship $N1 > D > N2$ exists, no instruction signal is output and the existing conditions are maintained.

The output circuit 77 receives the instruction signal from the CPU 75 and transmits it to the D/A converter 45. The D/A converter 45 is connected to the first reference voltage setting circuit 49 so as to output an analogue signal based on the instruction signal from the CPU 75 to change the set value of the first reference voltage setting circuit 49.

In a configuration such as outlined above, when a voltage is applied by the process current 31 through the resistance 37 to the working gap 29, a voltage proportional to the impedance of the working gap 29 is generated on the resistance 39. This voltage is divided at one of the input terminals of the comparator circuit 51 of the comparison control circuit 41 and is provided as the interpolar voltage $V_G$. The comparator circuit 51 compares the first reference voltage V1 obtained from the first reference voltage setting circuit 49 with the interpolar voltage $V_G$. When $V_G$ is found to be greater than V1, a high level signal is input to one of the input terminals of the first AND gate 53.

Then an electric discharge is not being produced in the working gap 29 between the tool electrode 27 and the workpiece W, and the insulation breakdown detection circuit 59 is not activated, the signal output from the second monostable multivibrator 63 is a low level signal so that a high level signal inverted by the inverter 57 is provided to the other part of the input terminal of the AND gate 53. Accordingly, when a high level signal is output by the comparator circuit 51, the AND gate 53 obtains the logical product of both high level signals and outputs a high level signal to the set terminal S of the first RS flip-flop 55. The first RS flip-flop 55 is set by means of this signal, and a high level signal is output to the base of the transistor 35 from the output terminal Q. The transistor 35 then is in the ON status.

Figure 6:
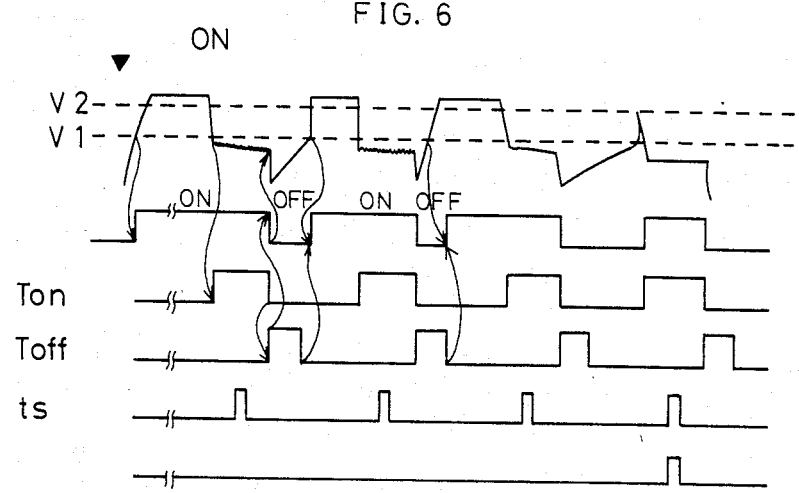
FIG. 6 is a timing chart for auxiliary equipment of the first embodiment of the present invention.
Figure 7:
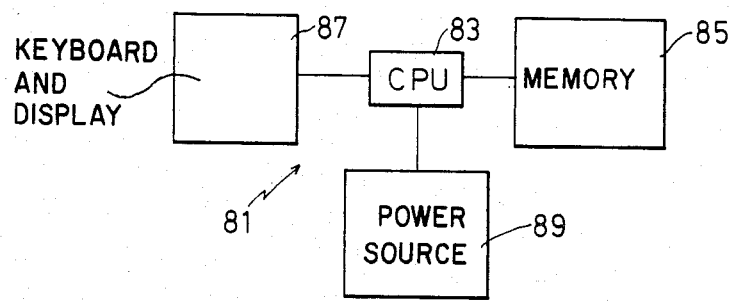
FIG. 7 is a block diagram showing a second embodiment of the present invention.

With the transistor 35 in the ON status, as described above, when the working gap 29 is suitably narrowed, a discharge is produced in the working gap 29, and the voltage in the working gap 29 suddenly drops, as shown in the upper stage of FIG. 6. In addition, at the same time as the discharge is produced, a voltage drop is produced at both ends of the resistance 33 by the current flowing through the resistance 33. Accordingly, the insulation breakdown detection circuit 59 detects the voltage produced at both ends of the resistance 33, and triggers the first monostable multivibrator 61. The first monostable multivibrator 61 receives the trigger signal and outputs a pulse signal of the ON time width (Ton in FIG. 6) of a previously set process pulse. This pulse signal is output to the second monostable multivibrator 63. Simultaneously with the fall of this pulse signal, the second monostable multivibrator 63 is triggered, and a pulse signal is output with the OFF time width (Toff in FIG. 6) of a previously set process pulse.

When the pulse signal output by the second monostable multivibrator 63 is provided to the reset terminal R of the first RS flip-flop 55, it resets the first RS flip-flop 55. Accordingly, the output from the output terminal Q is a low level signal, putting the transistor 35 into the OFF status. In addition, the pulse signal from the second monostable multivibrator 63 is inverted in the invertor 57, and a low level signal is provided to one of the input terminals of the first AND gate 53. For this reason, the reset of the first RS flip-flop 55 is prevented by a high level signal output from the comparator circuit 51 during the OFF-time width (Toff) of the process pulses. From the above sequence of events, the ON time (discharge time) is determined by the first monostable multivibrator 61, and the OFF-time (discharge interruption time) is determined by the second monostable multivibrator 63.

When the transistor 35 is OFF, corresponding to discharge interruption time, the impedance of the working gap 29 enters a restoration period, and eventually is restored. The impedance of the working gap 29 is detected as the interpolar voltage $V_G$ of the detection resistance 39, and is input to the comparator circuit 51. By the restoration of the impedance, when $V_G$ becomes greater than V1, the output from the first monostable multivibrator 61 is low in level, so that the first RS flip-flop 55 is reset through the AND gate 53, and the previously outlined actions are repeated.

In the abnormal electric discharge detection circuit 43, by taking the logical product of the result of comparing the second reference voltage V2 with the interpolar voltage $V_G$, and the sampling pulse Ts produced after the breakdown of the insulation, a pulse signal is output to the logical operation circuit 47 each time an abnormal discharge is detected due to the malfunction of the interpolar insulation recovery.

This pulse signal is input to the programmable counter 73 of the logical operation circuit 47 and counted by the counter (A). The count (D) made by the counter (A) is input to the CPU 75 at the every count-up of the counter (B). The CPU 75 compares the count (D) with the suitable set values N1 and N2. When D is greater than N1, the conclusion is made that there are many abnormal discharges, so that an instruction signal is output to the D/A inverter 45 through the output circuit 77 to increase the first reference voltage V1. When D is less than N2, an instruction signal is output to the D/A inverter 45 through the output circuit 77 to reduce the first reference voltage V1. The D/A converter 45 outputs an analogue signal V1 to the first reference voltage setting circuit 49 in conformance with the instruction signal, and the set value of the first reference voltage V1 is changed. As a result, the time for the interpolar voltage to recover to the first reference voltage V1, i.e. for the discharge interruption time to recover, is suitably changed.

In other words, by means of the present invention, the number of abnormal discharges within a set time is counted, and this number of abnormal discharges is compared to a preset fixed value. When the number of abnormal discharges is small, the discharge interruption time is shortened according to this ratio. When the number of abnormal discharges is large, the suspension time is lengthened. As a result, the process can always be made stable, and its efficiency is increased.

Figure 8:
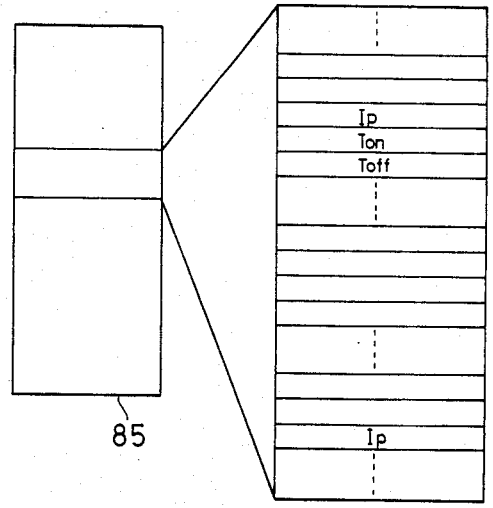
FIG. 8 is an explanatory drawing showing an example of memory.

FIG. 7 to FIG. 10 show a second embodiment of the present invention. In this embodiment, a control device 81 comprises an I/O section 87 and a memory section 85 connected to a CPU 83. This control device 81 controls, e.g., a processing power source 89 connected to the CPU 83. Such electrical processing characteristics as roughness of finished surface, tool electrode wear rate, process speed, processing clearance, etc., and such electrical processing conditions as polarity, maximum value of electric discharge current, discharge ON3#time and OFF3#time (interrupted time), etc., are recorded in the memory section 85. The memory mode is made from suitable combinations of process characteristics and conditions, for example, as shown in FIG. 8.

The I/O section 87, as shown in FIG. 9, comprises a display section 91 in which input and output data for the process condition set number, process condition, process characteristic, etc., are displayed, and a plurality of input key section 93 for roughness of surface finish (R), tool electrode wear rate (W), process velocity (V), processing clearance (E), retrieval (S), input (IN), and numerical values setting.

In this configuration, in the case where, for example, the maximum surface finish roughness, Rmax, is set at 15 μm, and the tool electrode wear rate W is set at less than 1%, because surface finish roughness R, as shown in FIG. 10, is classified into 15 ranks, the keys of the input key section 93 are used as shown in FIG. 9 for input of (surface roughness (W)), rank (1), input (IN)). Next, as shown in FIG. 10 (B), based on the table in which the tool electrode wear rate (W) is classified into 10 ranks, through the keys in the input key section 93 are used for the input of (wear rate (W)), rank (1), input (IN)). Next, by pressing the (retrieval (S)) key, a retrieval instruction is given. The combination of process conditions and process characteristics (referred to below as the process condition set) is stored in the memory section 85. After finding the process condition set which satisfies the conditions input by the operator, (that is 8 to 15 μm Rmax; surface roughness, 8 to 15 l μm Rmax; tool electrode wear rate, less than 1% in this case), the display becomes, for example, as shown in the upper boxes of FIG. 9. When the displayed process condition set is not satisfied, another process condition set, which satisfies the input conditions, is displayed on the display section 91 by pressing the retrieval key (S) once more. This operation can be repeated, and once the last process condition set has been retrieved, the retrieval process is repeated from the beginning.

In this manner, when the operator's requested conditions are satisfied by the process condition sets which are displayed in order, the process power supply 89 is automatically set to the above-mentioned process conditions for example, by repeating the key-in of (input (IN)). Setting process conditions while paying attention to other process characteristics is done in a similar way.

By means of the above embodiment, the optimum process conditions corresponding to specific process characteristics can easily be set.

Although only preferred embodiments are specifically illustrated and described herein, it will be appreciated that many modifications and variations of the present invention are possible in light of the above teachings and within the purview of the appended claims without departing from the spirit and intended scope of the invention.

What we claimed is:

1. A process for controlling an electric discharge machine of the type in which an electric discharge is applied across a working gap between an electrode and an electrically conductive workpiece, comprising the steps of:
   detecting an interpolar voltage porportional to the impedance of said working gap;
   comparing said interpolar voltage to a variable reference voltage and applying a pulse voltage across said working gap when the predetermined time of interruption of the electric discharge has lapsed and said interpolar voltage has exceeded said variable reference voltage;
   detecting and counting each occurrence of an abnormal discharge condition across said working gap;
   comparing the number of such counted occurrences of abnormal discharge conditions over a predetermined time period to first and second predetermined set point values;
   increasing said reference voltage when said number of counted occurrences over time exceeds said first predetermined set point value, thereby lengthening said time of interruption of the electric discharge; and
   decreasing said reference voltage when said number of counted occurrences over time is less than said second predtermined set point value, thereby reducing said time of interruption of the electric discharge.

2. The process of claim 1, wherein said second predetermined set point value is less than said first predetermined set point value.

3. The process for controlling the electric discharge machine of claim 1 further comprising the steps of:
   storing, in a memory of a control system, a plurality of groups of a combined plurality of processing characteristics and a corresponding plurality of processing conditions provided for an electric discharge machine, and a plurality of process characteristics which are classified into a plurality of ranks;
   retrieving the combined processing conditons and characteristics by specifying process characteristics based on that classification;
   displaying, in order, combinations satisfying the specified process characteristics; and
   setting the displayed combinations as operating conditions.

4. A control apparatus for an electrical discharge machine of the type in which an electric discharge is applied across a working gap between an electrode and an electrically conductive workpiece, comprising;
   a source of electric power for applying a pulse voltage through a suitable switching device across said working gap;
   means for receiving electrical power from the electric power source for supplying a minute current of a degree which will not produce an electric discharge across said working gap;
   means connected to said means for receiving for detecting an interpolar voltage proportional to the impedance of said working gap;
   a comparison control circuit for comparing said interpolar voltage to a variable first reference voltage and turning on the switching device to apply a pulse voltage across said working gap when a predetermined time of interruption of the electric discharge has lapsed and said interpolar voltage exceeds said first reference voltage;
   an abnormal discharge detection circuit for comparing the interpolar voltage to a preset second reference voltage for producing a signal indicative of the occurrence of each abnormal electric discharge when the commencement of discharge is detected in the working gap without the condition of the interpolar voltage being larger than the second reference voltage; and
   a logical operation circuit which counts the signals provided from the abnormal electric discharge detection circuit over a predetermined time period and compares the total count over that time period to first and second predetermined set point values and provids to the comparision control circuit a signal to increase the value of the first reference voltage when said total exceeds said first predetermined set point value, thereby lengthening said time of interruption of the electric discharge and a signal to decrease the value of said first reference voltage when said total is less than said second predetermined set point value, thereby reducing said time of interruption of the electric discharge.

5. The control apparatus of claim 4 wherein said second predetermined set point value is less than said first predetermined set point value.

6. A control apparatus for controlling an electric discharge machine of the type in which an electric discharge is applied across a working gap between an electrode and an electrically conductive workpiece, comprising;
   means for detecting an interpolar voltage proportional to the impedance of said working gap;
   means for comparing said interpolar voltage to a variable reference voltage and for applying a pulse voltage across said working gap when the predetrmined time of interruption of the electric discharge has lapsed and said interpolar voltage has exceeded said variable reference voltage;
   means for detecting and for counting each occurence of an abnormal discharge condition across said working gap;
   means for comparing the number of such counted occurrences of abnormal discharge conditions over a predetermined time period to first and second predetermined set point values;
   means for increasing said reference voltage when said number of counted occurrences over time exceeds said first predtermined set point value, thereby lengthening said time of interruption of electric discharge; and
   means for decreasing said reference voltage when said number of counted occurrences over time is less than said second predetermined set point value, thereby reducing said time of interruption of the electric discharge.

7. The control apparatus of claim 6, wherein said second predetermined set point value is less than said first predetermined set point value.

* * * * *

UNITED STATES PATENT AND TRADEMARK OFFICE
CERTIFICATE OF CORRECTION

PATENT NO. : 4,673,791

DATED : June 16, 1987

INVENTOR(S) : MASANORI KONNO ET AL

It is certified that error appears in the above-identified patent and that said Letters Patent is hereby corrected as shown below:

IN THE SPECIFICATION:

Column 1, line 62, after "conditions" delete ",";

Column 2, line 66, after "the" insert --computing--;

Column 4, line 62, after "is" delete ",";

Column 8, lines 14 and 15, delete "ON3#time and OFF3#time" and insert --ON time and OFF time--;

line 37, delete "(W))" and insert --(W)--;

line 44, after second occurrence of "15" delete "1".

IN THE CLAIMS:

Column 9, line 9, delete "porportional" and insert --proportional--;

line 30, delete "predtermined" and insert --predetermined--;

UNITED STATES PATENT AND TRADEMARK OFFICE
CERTIFICATE OF CORRECTION

PATENT NO. : 4,673,791

DATED : June 16, 1987

INVENTOR(S) : MASANORI KONNO ET AL

Page 2 of 2

It is certified that error appears in the above-identified patent and that said Letters Patent is hereby corrected as shown below:

IN THE CLAIMS:

Column 10, line 21, delete "provids" and insert --provides--;

line 21, delete "comparision" and insert --comparison--;

lines 42 and 43, delete "predetrmined" and insert --predetermined--;

line 55, delete "predtermined" and insert --predetermined--.

Signed and Sealed this

Third Day of November, 1987

Attest:

DONALD J. QUIGG

Attesting Officer

Commissioner of Patents and Trademarks